US011556342B1

(12) United States Patent
Kumar et al.

(10) Patent No.: US 11,556,342 B1
(45) Date of Patent: Jan. 17, 2023

(54) CONFIGURABLE DELAY INSERTION IN COMPILED INSTRUCTIONS

(71) Applicant: Amazon Technologies, Inc., Seattle, WA (US)

(72) Inventors: Ravi Kumar, Fremont, CA (US); Drazen Borkovic, Los Altos, CA (US)

(73) Assignee: Amazon Technologies, Inc., Seattle, WA (US)

( * ) Notice: Subject to any disclaimer, the term of this patent is extended or adjusted under 35 U.S.C. 154(b) by 47 days.

(21) Appl. No.: 17/031,495

(22) Filed: Sep. 24, 2020

(51) Int. Cl.
*G06F 9/30* (2018.01)
*G06F 8/40* (2018.01)
*G06F 8/41* (2018.01)
*G06F 1/3206* (2019.01)
*G06F 11/30* (2006.01)

(52) U.S. Cl.
CPC ........ *G06F 9/30181* (2013.01); *G06F 1/3206* (2013.01); *G06F 8/44* (2013.01); *G06F 9/30145* (2013.01); *G06F 11/3058* (2013.01)

(58) Field of Classification Search
None
See application file for complete search history.

(56) References Cited

U.S. PATENT DOCUMENTS

| | | | | |
|---|---|---|---|---|
| 6,564,328 | B1 * | 5/2003 | Grochowski | G06F 9/3869 713/320 |
| 7,742,910 | B2 * | 6/2010 | Grochowski | G06F 1/3203 703/18 |
| 7,793,125 | B2 * | 9/2010 | Berry, Jr. | G06F 1/266 713/320 |
| 8,566,568 | B2 * | 10/2013 | Michalak | G06F 9/384 712/237 |
| 9,558,002 | B2 * | 1/2017 | Veith | G06F 9/30145 |
| 9,703,351 | B2 * | 7/2017 | Carlson | G06F 1/329 |
| 10,108,454 | B2 * | 10/2018 | Svilan | G06F 9/4893 |
| 2008/0046692 | A1 * | 2/2008 | Michalak | G06F 9/30145 712/E9.05 |

(Continued)

FOREIGN PATENT DOCUMENTS

WO    WO-2005121950 A2 * 12/2005 ......... H04L 65/1083

OTHER PUBLICATIONS

'Conservation Cores: Reducing the Energy of Mature Computations' by Ganesh Venkatesh et al., copyright 2010, ACM. (Year: 2010).*

(Continued)

*Primary Examiner* — Steven G Snyder
(74) *Attorney, Agent, or Firm* — Kilpatrick Townsend & Stockton LLP

(57) ABSTRACT

Techniques are disclosed for utilizing configurable delays in an instruction stream. A set of instructions to be executed on a set of engines are generated. The set of engines are distributed between a set of hardware elements. A set of configurable delays are inserted into the set of instructions. Each of the set of configurable delays includes an adjustable delay amount that delays an execution of the set of instructions on the set of engines. The adjustable delay amount is adjustable by a runtime application that facilitates the execution of the set of instructions on the set of engines. The runtime application is configured to determine a runtime condition associated with the execution of the set of instructions on the set of engines and to adjust the set of configurable delays based on the runtime condition.

20 Claims, 12 Drawing Sheets

(56) References Cited

U.S. PATENT DOCUMENTS

| | | | | |
|---|---|---|---|---|
| 2011/0185203 | A1* | 7/2011 | Carlson | G06F 1/32 |
| | | | | 713/320 |
| 2013/0111226 | A1* | 5/2013 | Ananthakrishnan | |
| | | | | G06F 9/3885 |
| | | | | 713/300 |
| 2014/0006817 | A1* | 1/2014 | Bonen | G06F 1/3287 |
| | | | | 713/320 |
| 2014/0359328 | A1* | 12/2014 | Burns | G06F 1/324 |
| | | | | 713/322 |
| 2015/0268997 | A1* | 9/2015 | Svilan | G06F 1/329 |
| | | | | 718/102 |
| 2016/0098275 | A1* | 4/2016 | Xie | G06F 9/4893 |
| | | | | 712/215 |
| 2019/0361674 | A1* | 11/2019 | Fais | G06N 20/00 |
| 2020/0364508 | A1* | 11/2020 | Gurel | G05D 1/0221 |

OTHER PUBLICATIONS

'Operating Systems Should Manage Accelerators' by Sankaralingam Panneerselvam et al., HotPar'12: Proceedings of the 4th USENIX conference on Hot Topics in Parallelism, Jun. 2012. (Year: 2012).*
'Runtime Power Monitoring in High-End Processors: Methodology and Empirical Data' by Canturk Isci et al., Proceedings of the 36th International Symposium on Microarchitecture, 2003. (Year: 2003).*

* cited by examiner

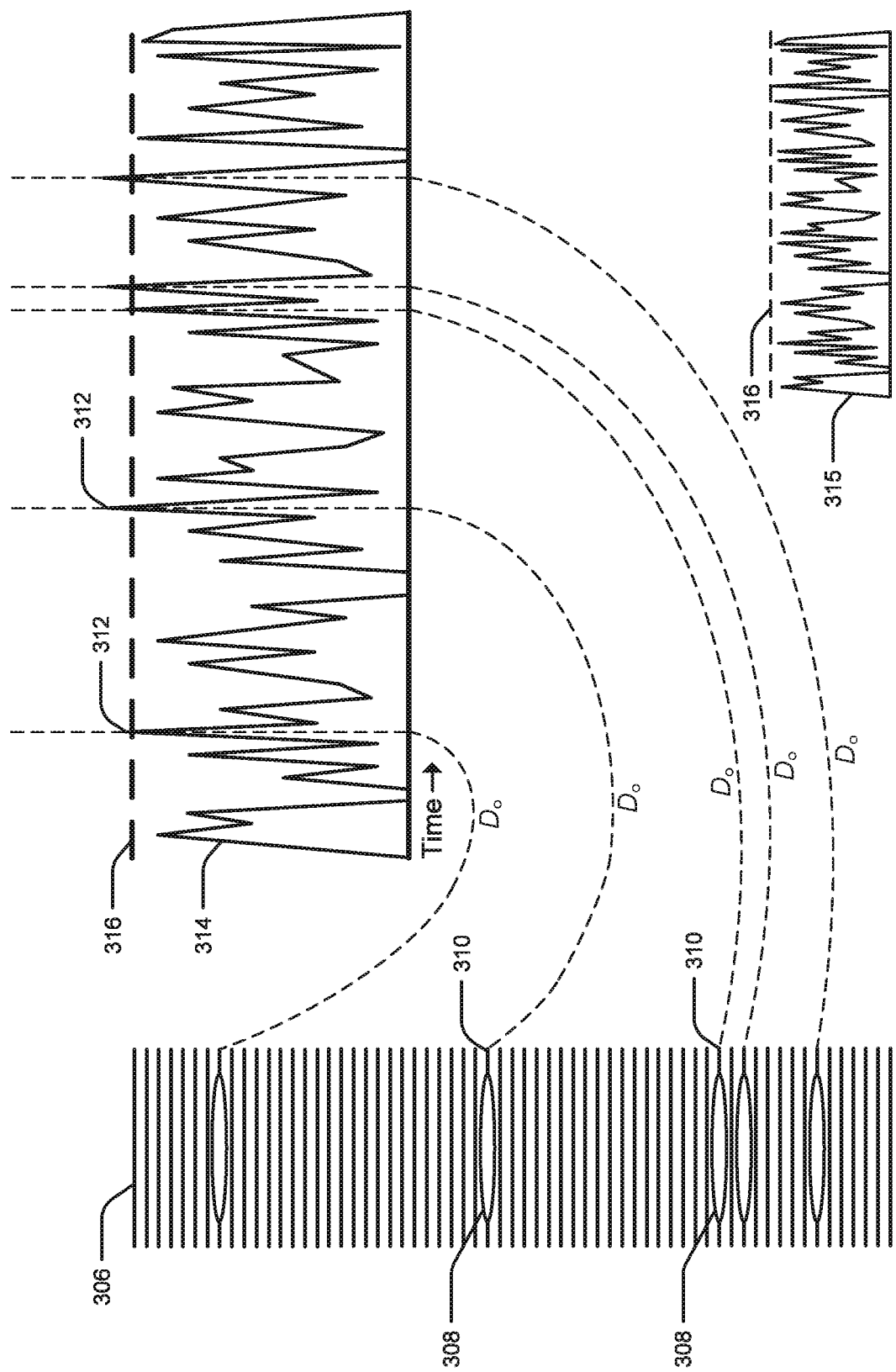

CONFIGURABLE DELAY INSERTION IN COMPILED INSTRUCTIONS

BACKGROUND

Artificial neural networks, which are often simply referred to as neural networks, are computing systems with architectures based on biological neural networks. Neural networks can be trained using training data to learn how to perform certain tasks, such as identifying or classifying physical objects, activities, characters, etc., from images or videos. A neural network, such as a deep neural network, may include multiple layers of processing nodes. Each processing node in a layer can perform computations on input data generated by processing nodes in the preceding layer to generate output data. For example, a processing node may perform a set of arithmetic operations such as multiplications and additions to generate an intermediate output, or perform post-processing operations on the intermediate output to generate a final output. A neural network may include thousands or more of processing nodes and millions or more of parameters.

The architecture of a neural network may include an input layer, an output layer, and a number of intermediate layers, often referred to as hidden layers. Each layer executes a computation on the outputs of the previous layer, with the last layer (the output layer) providing a final result. With more layers, a neural network can, theoretically, perform more complex tasks, such as language translations and identifying (or classifying) the contents of an image. A neural network with more than three hidden layers is sometimes referred to as a deep neural network. Deep neural networks can have many hidden layers, such as, for example, between five and more than a thousand layers.

Neural networks can be implemented using a central processing unit (CPU) to perform the computations. CPUs, however, tend to be optimized for sequential rather than parallel computations, and thus can suffer from poor response times. Graphics processing units (GPUs) are optimized for parallel computations, but not necessarily for the result from one computation unit to be provided directly to another computation unit. Often, the result must first be written to a memory and then read back. Although GPUs can have better response times than CPUs, it would still be desirable to improve the execution time of a neural network. Recently, special-purpose integrated circuit devices, such as neural network processors or accelerators, have been developed to execute neural networks more efficiently than either CPUs or GPUs.

BRIEF DESCRIPTION OF THE DRAWINGS

Various embodiments in accordance with the present disclosure will be described with reference to the drawings, in which:

FIG. 3 illustrates an example insertion of configurable delays into a set of instructions by a compiler;

DETAILED DESCRIPTION

Figure 1A:
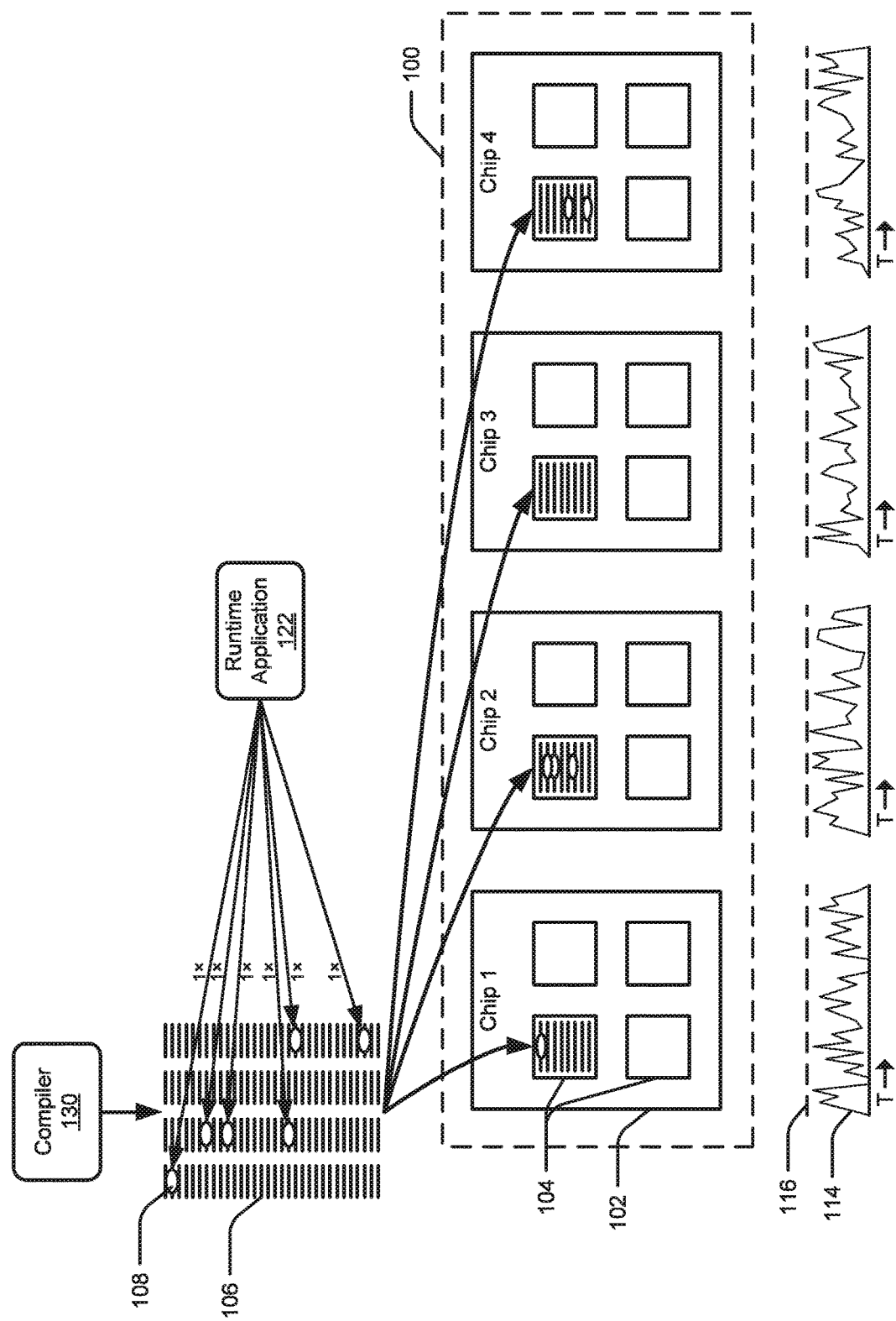
FIG. 1A illustrates example configurable delay insertions by a compiler.

The operations of one or more integrated circuit devices, such as processors, can be directed by instructions, which can be generated for an integrated circuit device by a compiler. A compiler is a software program that transforms programs written in human-readable programming language into machine language that can be understood by an integrated circuit device. The output of a compiler can be referred to as instructions, program code, program instructions, machine instructions, or an instruction stream, among other examples.

When multiple integrated circuit devices (e.g., processors) operate in coordination, in various examples, the compiler can produce a set of instructions for each device. The instructions for a device can include operations such as reading data from memory of the device, performing a computation on the data, and writing a result of the computation back to the memory of the device. In some examples, the devices can independently execute respective sets of instructions so that the devices can operate in parallel.

In some examples, the operation of one device may be dependent on the operation of another device. For example, a result computed by one device may be needed as the input of an operation to be performed by a second device. Limitations of the devices can also cause dependencies between them. For example, one device may have a limited amount of memory or a limited number of registers in which inputs for and results from the device can be stored. In this example, one device may need to store a result in a memory location in which the inputs for another device are stored.

When the operations of multiple integrated circuit devices have dependencies such as those described above, the compiler for the devices can capture the dependencies, for example, in a dependency or dataflow graph. In a dataflow graph, nodes in the graph can represent operations or sets of operations to be performed by individual devices. The edges or connections between the nodes can represent dependencies between the operations at the nodes. In some examples, synchronization of the devices can be achieved through the use of synchronization instructions that are embedded into the instruction stream by the compiler. Such instructions can allow the compiler to sequence the devices using specific synchronization actions from other devices or software. To maximize the device utilization, the compiler can focus on maximizing concurrency by reducing the frequency and duration of waits to the absolute minimum.

In such a highly efficient execution scheme, even minor temporal variations can result in unforeseen synchronization issues and result in incorrect execution. These temporal variations can be caused, for example, by hardware being run at different frequencies, associated memories being run with different configurations, memory congestion, fabric congestion, and interference from multiple models executing simultaneously on the same system. The compiler may not be able to easily account for all such scenarios.

Another issue arises when devices are significantly parallelized, which results in an increase of instantaneous power consumption, which can overload the system power supply and/or cause unsafe heating of the system. For example, while the thermal or electrical characteristics of a single device operating alone within the system may pose little threat, multiple devices operating in parallel can consume and produce significantly higher amounts of power and heat.

Embodiments of the present disclosure provide methods, systems, and other techniques for inserting configurable delays into an instruction stream generated by a compiler. Such delays are useful for characterizing hardware system issues, debugging compiler synchronization issues, and reducing the power consumption and heat generation of devices operating in parallel. Embodiments of the present disclosure are particularly well suited for machine learning acceleration (MLA) systems consisting of multiple code-pendent sets of hardware engines processing data in parallel. An MLA system can include one or more physical chips each housing one or more sets of engines. The MLA system can vary in size depending on engine counts, with the workload being distributed across engines and synchronized as needed where MLA engines wait on each other's outputs.

As noted above, insertion of configurable delays by the compiler can help characterize hardware system issues. Variations exist between systems due to dissimilarities in hardware, such as memory access variations, hardware clock frequencies variations, etc. Such temporal delays can cause changes in data traffic patterns between engines and memories. Inserting delays in the instruction stream can expose potential congestion issues in data movement within the hardware. As described herein, such delays can be inserted methodically or randomly.

Insertion of configurable delays by the compiler can also help to debug compiler synchronization issues. In some embodiments, the scheduler in the compiler uses synchronization mechanisms to maximize engine utilization. However, aggressive synchronization by the scheduler can cause either data corruption or hangs during execution. Delay insertions during testing can expose compiler scheduler bugs and, in general, test the robustness of the compiler's synchronization mechanisms.

Insertion of configurable delays by the compiler can further help to reduce power consumption and/or heat generation. Certain workloads can maximize hardware (e.g., integrated circuit) utilization and cause excessive power consumption. This can cause unacceptable heat generation, triggering thermal protection mechanisms, which will shut down the systems causing major workload disruptions. Delay insertions can slow down execution just enough and lower overall system power consumption. When properly calibrated, this can be accomplished with an acceptable performance penalty. In some examples, machine-learning (e.g., neural network) workloads use multiple chips and as such delay insertions can be used: (1) globally across the entire system of multiple sets of chips; (2) for specific chips within the system (e.g., when workloads are unevenly distributed across chips); or (3) for specific engines within a chip (e.g., certain engines having higher propensities to create hotspots).

Delays that are manually inserted can help calibrate and test the implications of the compiler's output on the hardware, such as, for example, synchronization robustness across various models and systems. Carefully crafted delay specifications test both the hardware implementation of the synchronization primitives (e.g., synchronization events and semaphores) and the compiler's usage of these hardware primitives for synchronization. The synchronization robustness can be important to make the system (both the hardware and compiler together) agnostic to several real life hardware timing and variations. Such variations are mimicked by inserting delays in the testing process. It further helps to verify that the compiler correctly uses the provided hardware synchronization mechanisms. For example, delays in the testing can change relative speeds of the engines, but should have no functional impact.

In some embodiments, delay insertion can be automatic, such that the compiler can determine locations for inserting the delays into the instruction stream. Since certain instructions or instruction streams require intense parallel computation, they are power intensive by nature and cause harmful power and thermal surges. The compiler figures out these potential "hot spots" and "stretches out" or modifies the sequence by adding delays. In some instances, the compiler adds instructions or pseudo instructions for delays. These inserted instructions can be considered as "recommendations" from the compiler. The final delay would be dependent on the actual system, as the compiled program can run on many variants of the hardware system.

In some embodiments, the final delay for each inserted configurable delay is computed during runtime by the runtime software, which can swap out the pseudo-instructions for real instructions. In one example, the compiler may insert a hardware-supported delay instruction such as a no operation (NOP) or WAIT instruction, and the runtime software can modify or set the associated delay amount (e.g., an adjustable NOP instruction, a number of NOP instructions, or a time associated with a WAIT instruction). In another example, the compiler may insert an instruction or command to control or adjust a programmable hardware throttle mechanism, which is a programmable entity that controls each engine's rate of instruction processing. For example, a programmable hardware throttle mechanism may include a frequency selector to speed up or slow down a clock frequency of an execution engine. In one implementation, the compiler can add directives in the instruction stream to turn on and off the mechanism. In another example, the compiler may insert pseudo-instructions which can be replaced by the runtime software with either delay instructions and/or throttle mechanisms.

When adjusting the final delay amount, the runtime software can consider a number of runtime conditions which may be unknown at compile time. In various embodiments, the runtime conditions may include the current number of inferences, dynamic information provided by the board's firmware (e.g., the current temperature), electrical/thermal model profiles that the compiler generates (e.g., the runtime software can determine an aggregate electrical/thermal model of all currently running models based on the profile(s)), the average power consumption or thermal generation of one or more engines (e.g., the runtime software can determine the average power or heat of all currently running models), or a sum of computes occurring on the system during a period of time, among other possibilities.

To detect "hot spots," the compiler may analyze the power usage of each engine by inspecting its instruction stream. Instruction parameters such as the nature of the instruction's computation and the sizes and data types of its inputs may directly correlate to the power consumption. For example an instruction operating on two large tensors of 32-bit floating point data will consume a relatively significant amount of power, and a consecutive stream of similar instructions may imply a significant power consumption. The compiler can estimate approximate power consumption based on calibration data provided from simulations and experiments in the lab with power and thermal measurement equipment. With this type of analysis, the compiler can elect engines and add recommendations.

Embodiments described herein are advantageous over an approach of simply reducing clock speed. For example, such reduction could be static in that the clock frequency is reduced so that the power consumption never exceeds the thermal limit or the power supply current limit. One disadvantage of static clock frequency reduction is that the speed is reduced for all operations in the execution, even for operations that would not exceed power consumption limits. This can, therefore, unnecessarily limit the performance. While clock speed reduction can be dynamic (e.g., external hardware such as an additional micro controller can monitor the power consumption of the main chip and reduce the frequency when the consumption is too high), additional hardware is needed, thereby increasing the cost and the complexity of the system. Additionally, unlike temperature changes, current increases can occur quickly and thus external hardware might not be able to react fast enough and avoid current limits. Furthermore, a clock signal has sharp edges and, therefore, is a significant source of electrical noise. Thus, changing the clock frequency dynamically significantly increases the frequency spectrum of electrical noise, and filtering noise with wider frequency spectrum requires more complicated filter circuitry and more expensive filter components (e.g., larger capacitors with lower internal resistance).

In some embodiments, the disclosed approach relies on the compiler estimating execution hot spots. To estimate hot spots, the compiler may estimate time-varying thermal/electrical profiles for individual instruction execution, such as matrix multiplication, activation, pooling, and direct memory access (DMA) transfers. The compiler may also estimate average and peak power consumption of individual instructions. The quality of the power control can depend on these estimates. In some instances, a method of obtaining these estimates may be to run sample inferences and measure actual delays and power consumption during the inferences.

In the following description, various examples will be described. For purposes of explanation, specific configurations and details are set forth in order to provide a thorough understanding of the examples. However, it will also be apparent to one skilled in the art that the example may be practiced without the specific details. Furthermore, well-known features may be omitted or simplified in order not to obscure the embodiments being described.

Figure 1B:
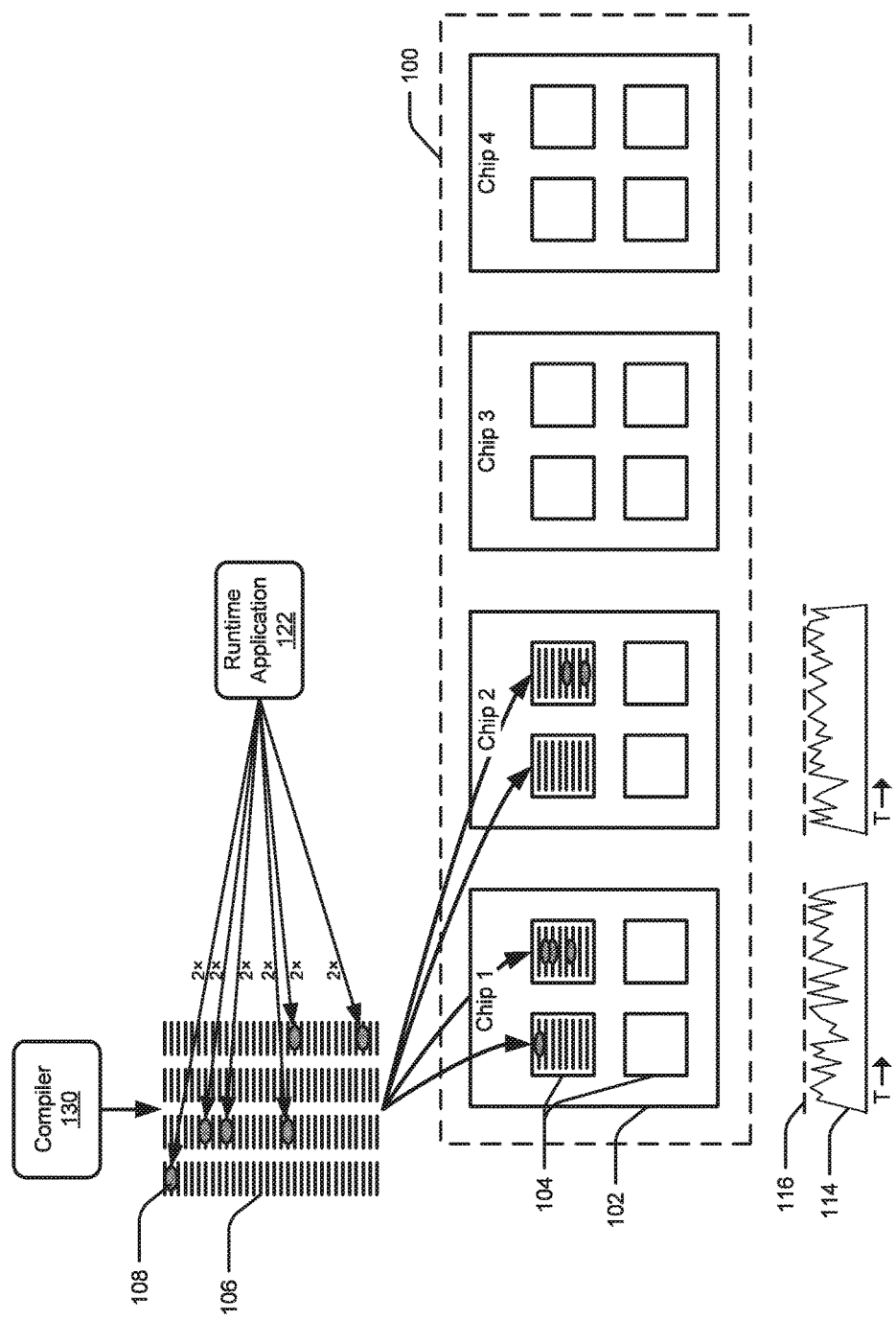
FIG. 1B illustrates example configurable delay insertions by a compiler.
Figure 1C:
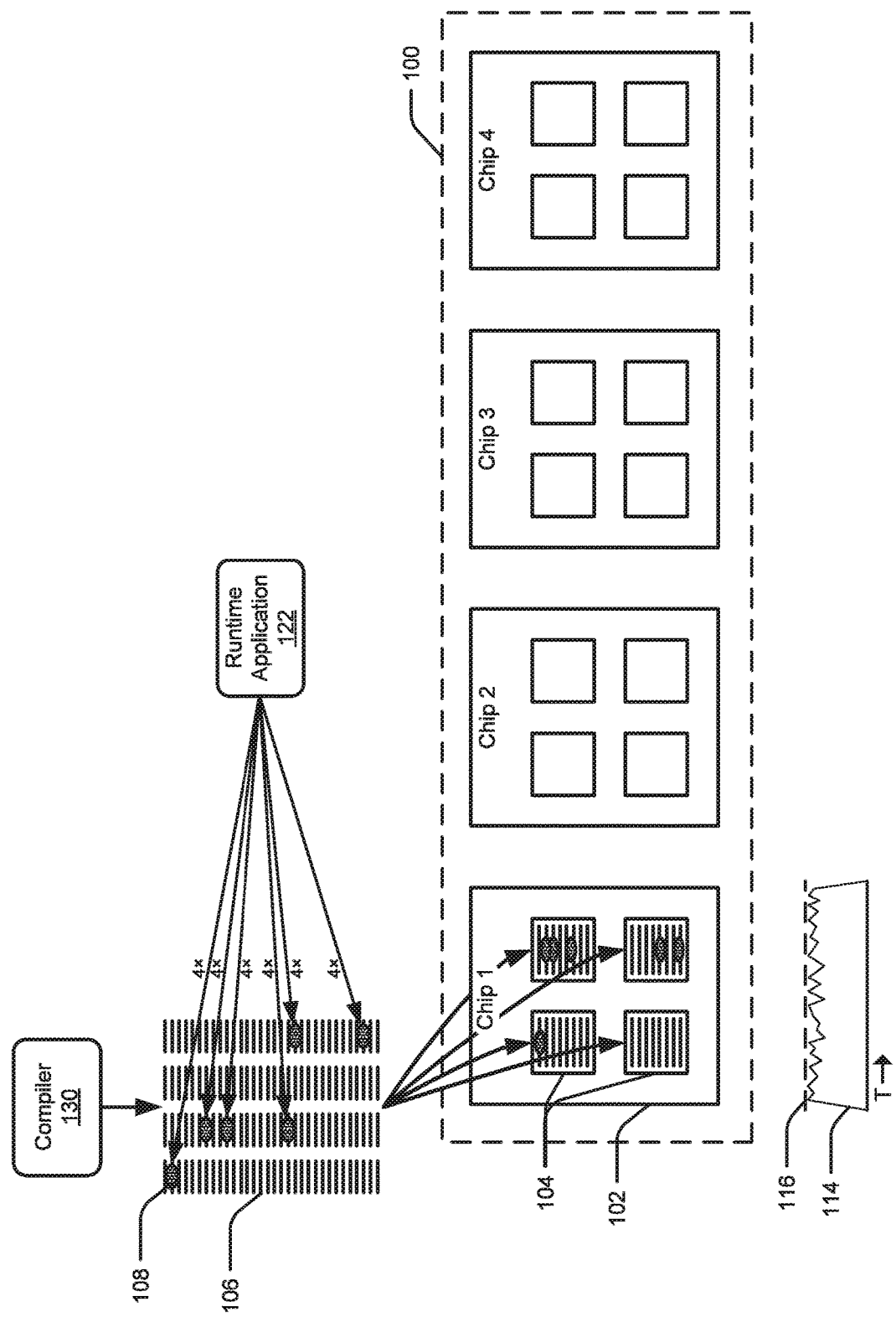
FIG. 1C illustrates example configurable delay insertions by a compiler.

FIGS. 1A-1C illustrate various examples of configurable delay insertions by a compiler 130 for a system 100, such as an MLA system, according to various embodiments of the present disclosure. In reference to FIG. 1A, the compiler 130 is caused to generate sets of instructions 106 (or collectively referred to as a set of instructions 106) for execution on engines 104 of the system 100. In some implementations, the engines 104 may be acceleration engines of an MLA system. The engines 104 may be distributed between different hardware elements 102 of the system 100. In the illustrated example, the system 100 includes four hardware elements 102, and each of the hardware elements 102 include four engines 104.

Without knowledge of which of the engines 104 will be used for executing the instructions, the compiler 130 generates a set of instructions 106 for four engines 104, as shown by the four adjacent columns of instructions 106. The complier 130 may analyze the sets of instructions 106 and determine locations for inserting configurable delays 108 into the instructions 106 based on the analysis. The compiler 130 may then insert the configurable delays 108 into the instructions 106 at the determined locations. Each of the configurable delays 108 may include an adjustable delay amount that delays the execution of the instructions 106 on the engines 104. In some embodiments, the compiler may initialize the adjustable delay amount to a nominal delay amount A. In some embodiments, the compiler may not initialize the adjustable delay amount to any value, and may instead leave a placeholder for the runtime application 122.

The analysis of the instructions 106 that is performed by the compiler 130 may include generating thermal or electrical profiles 114 for an expected execution of the sets of instructions 106 on the engines 104. In the illustrated example, the expected execution of the sets of instructions 106 may be that each of the sets of instructions 106 is to be executed by engines 104, each embedded onto different hardware elements 102. In other examples, the expected execution of the sets of instructions 106 may be that each of the sets of instructions 106 is to be executed by engines 104 embedded onto fewer (e.g., one, two, or three) hardware elements 102, thus having at least two engines 104 sharing a single hardware element 102. The compiler 130 may further generate a threshold 116, against which the thermal or electrical profiles 114 may be compared. The threshold 116 may represent an thermal or electrical limit, above which any thermal generation or power usage is expected to be harmful to the system 100.

Whether the sets of instructions 106 are to be executed by engines 104 on a single hardware element 102 or distributed between multiple hardware elements 102 can change the thermal or electrical profiles 114, as engines 104 embedded onto a single hardware element 102 are expected to at least partially share electrical resources or combine their thermal generation. In some embodiments, the compiler 130 may generate an aggregate thermal or electrical profile 114 for groupings of the sets of instructions 106 that are to be executed on a single hardware element 102. In some embodiments, the runtime application 122 may combine multiple profiles to generate the aggregate thermal or electrical profile 114 for groupings of the sets of instructions 106 that are to be executed on a single hardware element 102.

During runtime, the runtime application 122 may determine one or more runtime conditions associated with the execution of the set of instructions 106 on the engines 104. In the illustrated example, the runtime application 122 determines that each of the sets of instructions 106 are to be executed on engines 104 embedded onto different hardware elements 102. As such, the runtime application 122 may adjust the set of configurable delays to account for the distribution of used engines 104 by applying a 1× multiplier (or equivalently by applying no multiplier) to each of the adjustable delay amounts of the configurable delays 108.

In reference to FIG. 1B, and similar to FIG. 1A, the compiler 130 generates sets of instructions 106 for engines 104, and analyzes the sets of instructions 106 to determine locations for inserting configurable delays 108 into the instructions 106. Each of the configurable delays 108 may include an adjustable delay amount initialized to a nominal delay amount $D_o$. The compiler 130 may analyze the sets of instructions 106 and generate thermal or electrical profiles 114 for an expected execution of the sets of instructions 106 on the engines 104.

During runtime, the runtime application 122 may determine one or more runtime conditions associated with the execution of the set of instructions 106 on the engines 104, including that two of the sets of instructions 106 are to be executed on engines 104 embedded onto a first hardware element 102 and the other two of the sets of instructions 106 are to be executed on engines 104 embedded onto a second hardware element 102. Optionally, the runtime application 122 may combine multiple thermal or electrical profiles to generate the aggregate thermal or electrical profiles 114 for the two groupings of the sets of instructions 106 that are to be executed on two hardware elements 102. Based on the runtime conditions (e.g., including the groupings of the sets of instructions 106 on hardware elements 102), the runtime application 122 may adjust the set of configurable delays by applying a 2× multiplier to each of the adjustable delay amounts.

In reference to FIG. 1C, and similar to FIGS. 1A-1B, the compiler 130 generates sets of instructions 106 for engines 104 and analyzes the sets of instructions 106 to determine locations for inserting configurable delays 108 into the instructions 106. Each of the configurable delays 108 may include an adjustable delay amount initialized to a nominal delay amount $D_o$. The compiler 130 may analyze the sets of instructions 106 and generate thermal or electrical profiles 114 for an expected execution of the sets of instructions 106 on the engines 104.

During runtime, the runtime application 122 may determine one or more runtime conditions associated with the execution of the set of instructions 106 on the engines 104, including that all four of the sets of instructions 106 are to be executed on engines 104 embedded onto a single hardware elements 102. Optionally, the runtime application 122 may combine multiple thermal or electrical profiles to generate the aggregate thermal or electrical profile 114 for the grouping of the sets of instructions 106 that are to be executed on the single hardware element 102. Based on the runtime conditions (e.g., including the grouping of the sets of instructions 106 on hardware elements 102), the runtime application 122 may adjust the set of configurable delays by applying a 4x multiplier to each of the adjustable delay amounts.

Figure 2:
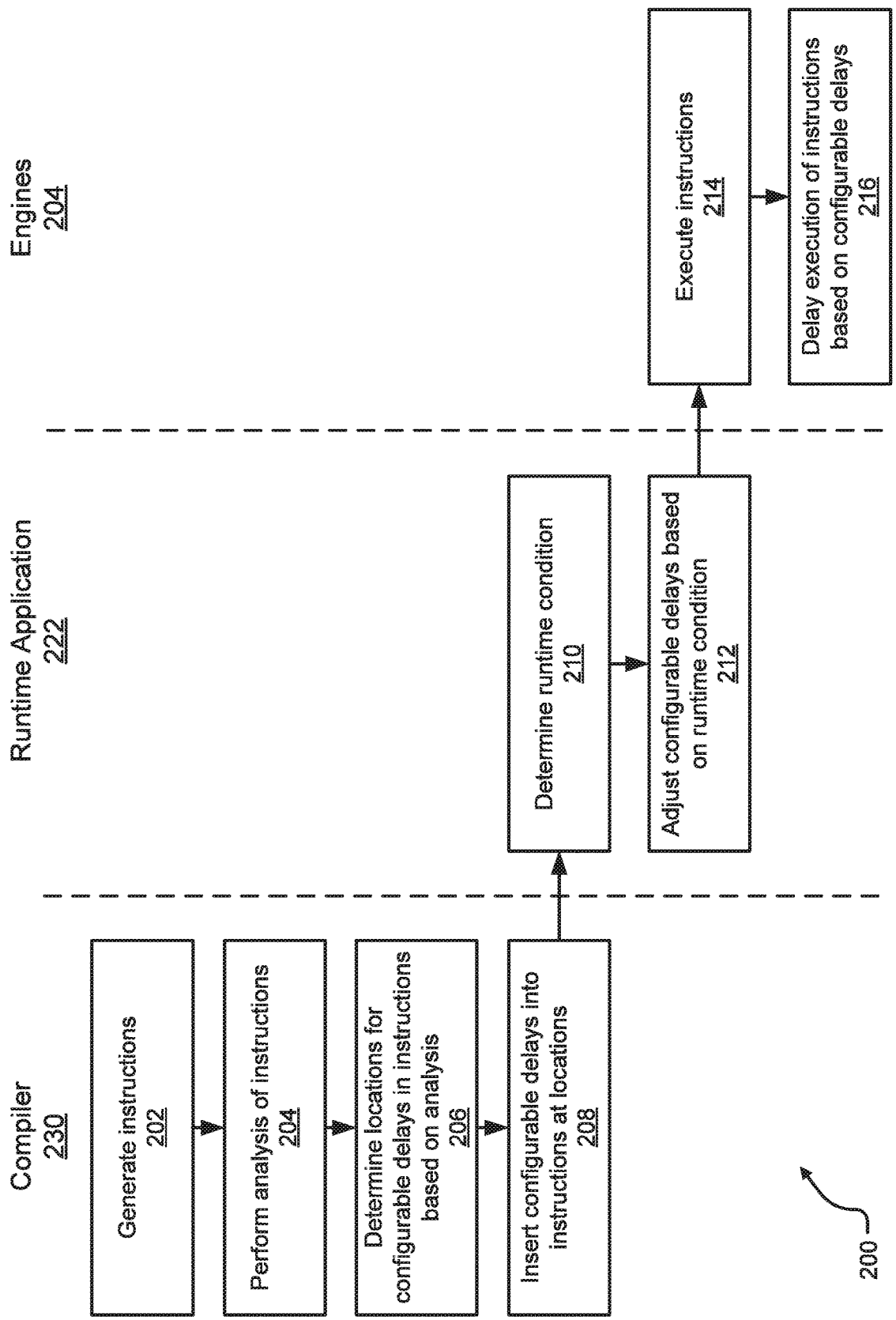
FIG. 2 illustrates an example method of utilizing configurable delays in an instruction stream.

FIG. 2 illustrates an example method 200 of utilizing configurable delays in an instruction stream, according to some embodiments of the present disclosure. One or more steps of method 200 may be omitted during performance of method 200, and steps of method 200 need not be performed in the order shown. One or more steps of method 200 may be performed by a compiler 230, a runtime application 222, or a set of engines 204, as indicated in FIG. 2. Method 200 may be implemented as a computer-readable medium or computer program product comprising instructions which, when the program is executed by one or more computers, cause the one or more computers to carry out the steps of method 200. Such computer program products can be transmitted, over a wired or wireless network, in a data carrier signal carrying the computer program product.

At step 202, a set of instructions are generated. The set of instructions may be generated by a compiler (e.g., compilers 130, 230) to be executed on a set of engines (e.g., engines 104, 204). The compiler may be executed on a host system. The set of engines may be distributed between a set of hardware elements (e.g., hardware elements 102) of a system (e.g., system 100). In some embodiments, the set of hardware elements may be at least partially electrically or thermally isolated from each other. In some embodiments, the set of hardware elements correspond to a set of chips.

In some embodiments, the set of engines may be embedded onto the set of hardware elements. In one example, a first engine may be embedded onto a first hardware element, a second engine may be embedded onto a second hardware element, a third engine may be embedded onto a third hardware element, and a fourth engine may be embedded onto a fourth hardware element. In another example, a first and second engine may be embedded onto a first hardware element and third and fourth engine may be embedded onto a second hardware element. In another example, a first, second, third, and fourth engine may be embedded onto a first hardware element.

At step 204, an analysis of the set of instructions is performed. The set of instructions may be analyzed by the compiler. The set of instructions may be analyzed after the set of instructions are generated or while the set of instructions are being generated. In some embodiments, performing the analysis of the set of instructions may include generating thermal or electrical profiles (e.g., thermal or electrical profiles 114) associated with the set of instructions based on an expected execution of the set of instructions on the set of engines.

At step 206, a set of locations in the set of instructions for inserting a set of configurable delays (e.g., configurable delays 108) are determined based on the analysis. The set of locations may be determined by the compiler. In some embodiments, the set of locations may correspond to potential thermal or electrical hotspots. For example, step 206 may include determining the set of locations in the set of instructions for potential thermal or electrical hotspots based on the analysis. In some embodiments, the set of locations may be determined based on a comparison between the thermal or electrical profiles and a predetermined threshold (e.g., threshold 116).

At step 208, the set of configurable delays are inserted into the set of instructions. The set of configurable delays may be inserted by the compiler. In some embodiments, each of the set of configurable delays includes an adjustable delay amount that delays an execution of the set of instructions on the set of engines. In some embodiments, each adjustable delay amount is adjustable by a runtime application (e.g., runtime applications 122, 222) that facilitates the execution of the set of instructions on the set of engines.

At step 210, a runtime condition associated with the execution of the set of instructions on the set of engines is determined. The runtime condition may be determined by the runtime application by, for example, receiving or retrieving data (e.g., receiving user input) indicative of the runtime condition. In some embodiments, the runtime condition includes a total number of used engines from the set of engines on the set of hardware elements (used engines corresponding to those of the set of engines that are to execute any of the set of instructions). In some embodiments, the runtime condition includes a distribution of used engines from the set of engines between the set of hardware elements. In some embodiments, the runtime condition includes a maximum number of used engines from the set of engines on a single hardware element from the set of hardware elements. In some embodiments, the runtime condition includes a size of an input associated with the execution of the set of instructions on the set of engines.

At step 212, the set of configurable delays are adjusted. The set of configurable delays may be adjusted by the runtime application. In some embodiments, the set of configurable delays are adjusted based on the runtime condition. In some embodiments, adjusting the set of configurable delays includes increasing or decreasing the adjustable delay amount for one or more of the set of configurable delays.

At step 214, the set of instructions are executed on the set of acceleration engines.

At step 216, while executing the set of instructions, the execution of the set of instructions is delayed based on the set of configurable delays. In some embodiments, the execution of the set of instructions is delayed in accordance with the adjustable delay amount for each of the set of configurable delays.

FIG. 3 illustrates an example insertion of configurable delays 308 into a set of instructions 306 by a compiler, according to some embodiments of the present disclosure. In the illustrated example, the compiler analyzes a set of instructions 306 and generates a thermal or electrical profile 314 based on the analysis. The compiler then compares the thermal or electrical profile 314 to a threshold 316 and identifies potential thermal or electrical hotspots 312 where the thermal or electrical profile 314 exceeds the threshold 316. The compiler determines a set of locations 310 corresponding to the potential thermal or electrical hotspots 312 and inserts a set of configurable delays 308 at the set of locations 310. In some instances, the set of locations 310 may be pointers to specific instructions in the set of instructions 306. The compiler may also initialize the adjustable delay amounts of the configurable delays 308 to a value, such as a nominal delay amount $D_o$.

To insert each of the configurable delays 308, the compiler may identify the instruction 306 that is located at or is closest to each location 310 (e.g., the instruction that each location 310 points to). The compiler may insert the configurable delay at the identified instruction, immediately prior to the identified instruction, or immediately after the identified instruction. In some embodiments, each configurable delay 308 may include one or more instructions for realizing the adjustable delay amount of the configurable delay. In some embodiments, each configurable delay 308 may modify an existing instruction 306 to realize the adjustable delay amount of the configurable delay. For example, one configurable delay may include instructions for controlling a hardware throttle mechanism that adjusts a rate for executing the set of instructions 306.

In some implementations, the compiler may generate an adjusted thermal or electrical profile 315 that incorporates the effects of the configurable delays 308 to the thermal or electrical profile 314. In some instances, the compiler may determine whether the adjusted thermal or electrical profile 315 exceeds the threshold 316 to determine whether any of the adjustable delay amounts need to be initialized to a greater value. In the illustrated example, the adjusted thermal or electrical profile 315 is determined to not exceed the threshold 316 and thus the compiler may determine to not make any adjustments to the adjustable delay amounts. It should be noted that, due to the addition of the configurable delays 308, the adjusted thermal or electrical profile 315 may have a greater length (e.g., in time and/or in number of instructions) than the thermal or electrical profile 314.

Figure 4A:
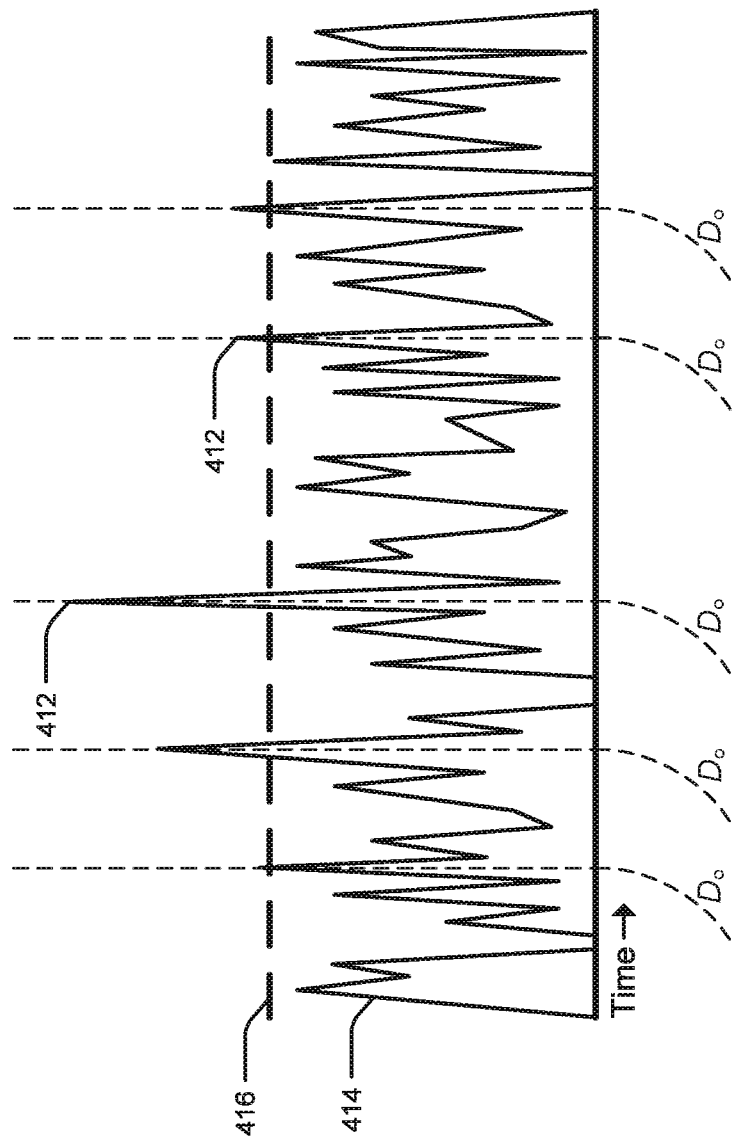
FIG. 4A illustrates an example of initializing configurable delays by a compiler.
Figure 4B:
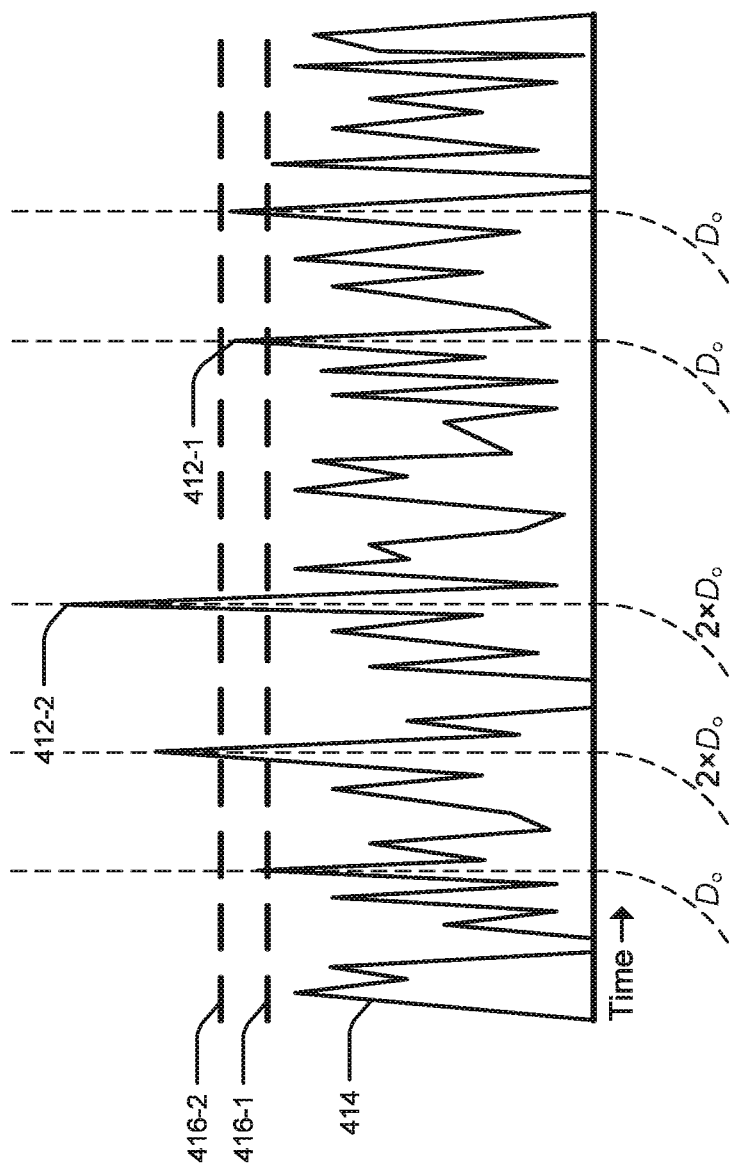
FIG. 4B illustrates an example of initializing configurable delays by a compiler.
Figure 4C:
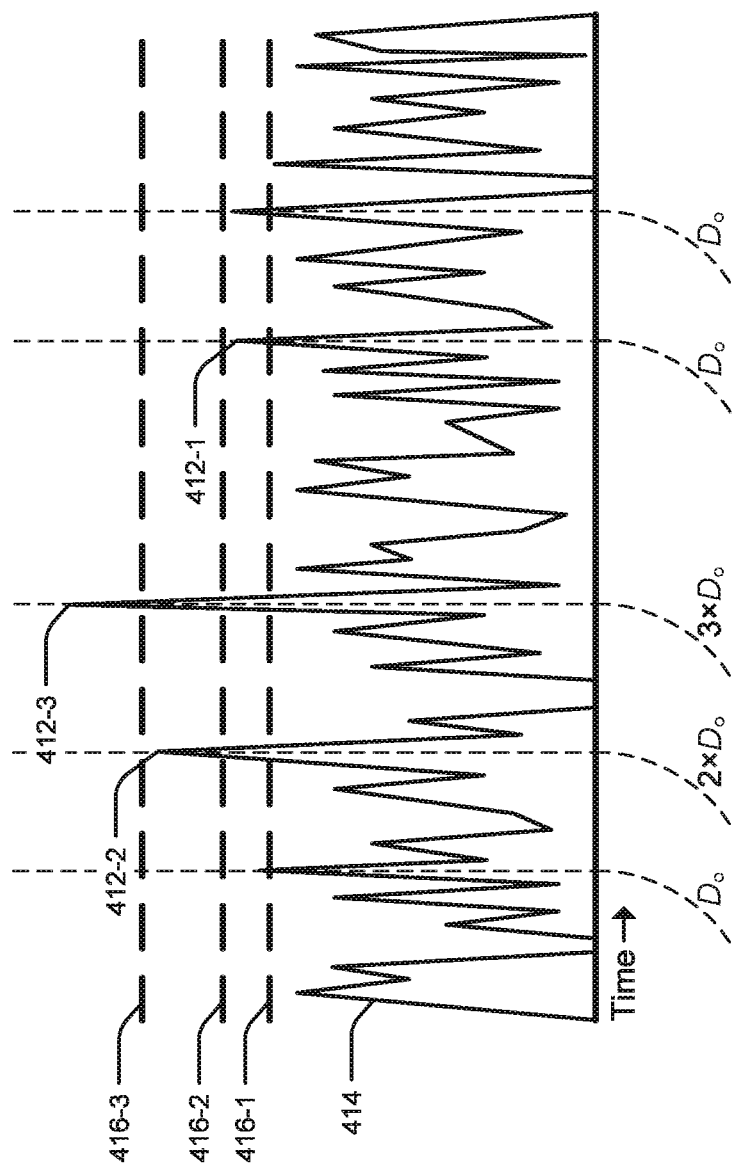
FIG. 4C illustrates an example of initializing configurable delays by a compiler.

FIGS. 4A-4C illustrate various examples for initializing configurable delays by a compiler, according to various embodiments of the present disclosure. In the scheme illustrated in FIG. 4A, the compiler generates a thermal or electrical profile 414 and performs a comparison to a single threshold 416. The compiler then identifies potential thermal or electrical hotspots 412 where the thermal or electrical profile 414 exceeds the threshold 416. The compiler then determines a set of locations corresponding to the potential thermal or electrical hotspots 412, inserts a set of configurable delays at the set of locations, and initializes the adjustable delay amounts of the set of configurable delays to a nominal delay amount $D_o$.

In the scheme illustrated in FIG. 4B, the compiler generates a thermal or electrical profile 414 and compares the thermal or electrical profile 414 to a first threshold 416-1 and a second threshold 416-2. The compiler then identifies a first set of potential thermal or electrical hotspots 412-1 where the thermal or electrical profile 414 exceeds only the first threshold 416-1 and a second set of potential thermal or electrical hotspots 412-2 where the thermal or electrical profile 414 exceeds both the first threshold 416-1 and the second threshold 416-2. The compiler then determines a set of locations corresponding to the potential thermal or electrical hotspots 412, inserts a set of configurable delays at the set of locations, and initializes the adjustable delay amounts of the set of configurable delays to a first delay amount (e.g., $D_o$) for the first set of potential thermal or electrical hotspots 412-1 and to a second delay amount (e.g., $2 \times D_o$) for the second set of potential thermal or electrical hotspots 412-2.

In the scheme illustrated in FIG. 4C, the compiler generates a thermal or electrical profile 414 and compares the thermal or electrical profile 414 to a first threshold 416-1, a second threshold 416-2, and a third threshold 416-3. The compiler then identifies a first set of potential thermal or electrical hotspots 412-1 where the thermal or electrical profile 414 exceeds only the first threshold 416-1, a second set of potential thermal or electrical hotspots 412-2 where the thermal or electrical profile 414 exceeds both the first threshold 416-1 and the second threshold 416-2 but not the third threshold 416-3, and a third set of potential thermal or electrical hotspots 412-2 where the thermal or electrical profile 414 exceeds each of the first threshold 416-1, the second threshold 416-2, and the third threshold 416-3. The compiler then determines a set of locations corresponding to the potential thermal or electrical hotspots 412, inserts a set of configurable delays at the set of locations, and initializes the adjustable delay amounts of the set of configurable delays to a first delay amount (e.g., $D_o$) for the first set of potential thermal or electrical hotspots 412-1, a second delay amount (e.g., $2 \times D_o$) for the second set of potential thermal or electrical hotspots 412-2, and a third delay amount (e.g., $3 \times D_o$) for the third set of potential thermal or electrical hotspots 412-3.

Figure 5A:
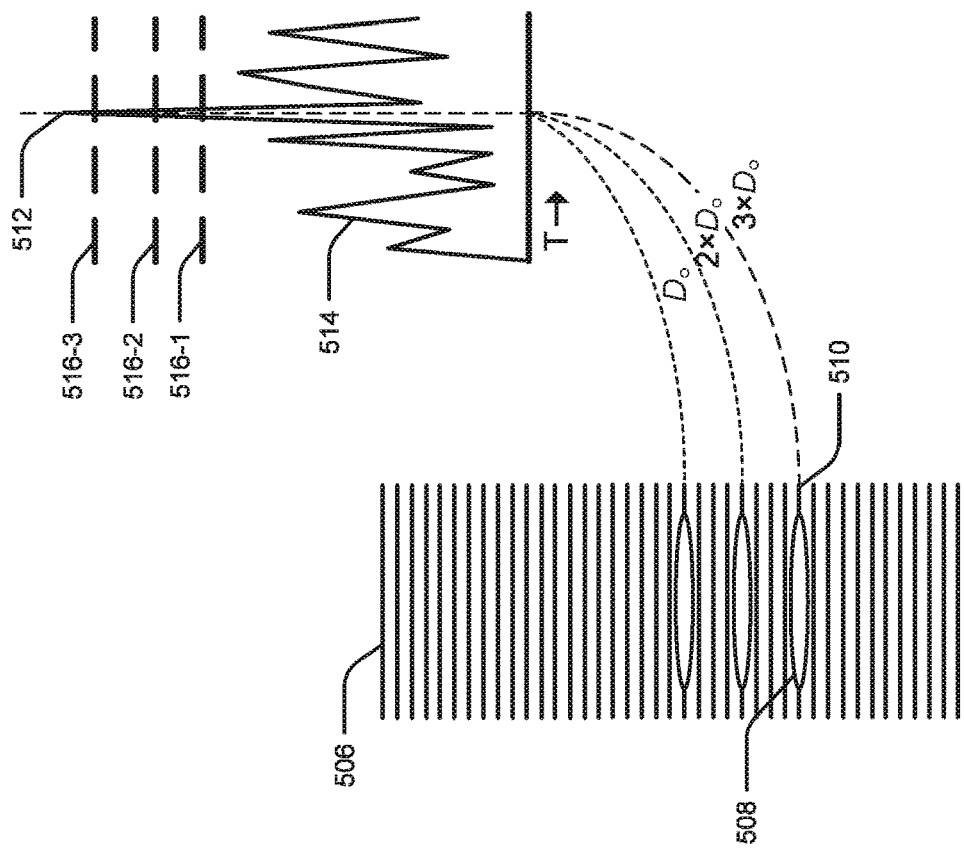
FIG. 5A illustrates example insertions of configurable delays into a set of instructions.
Figure 5B:
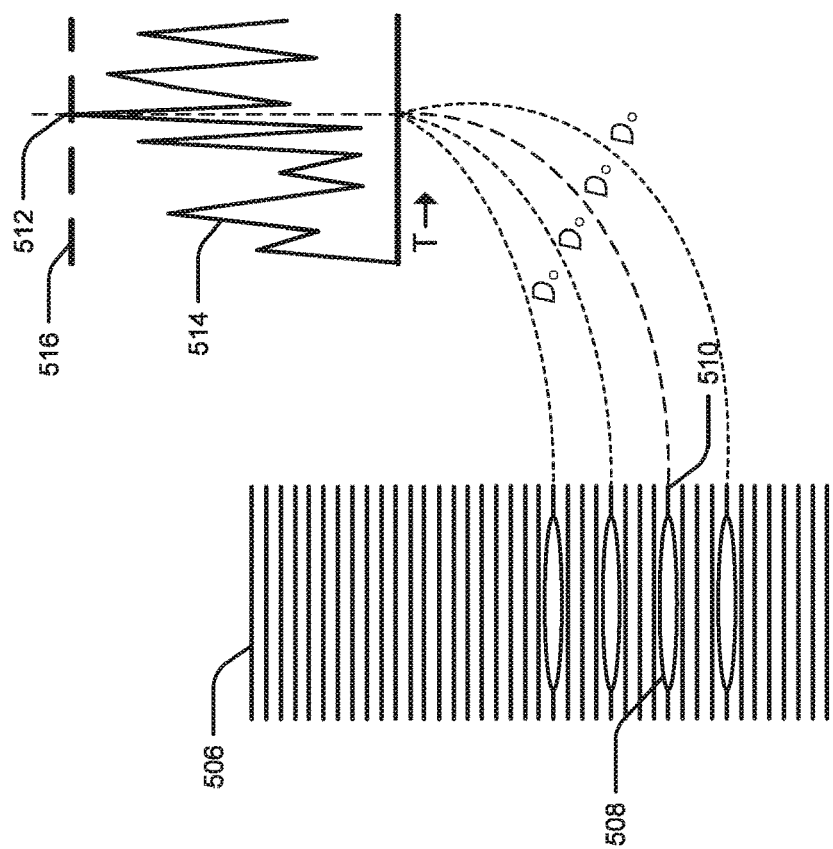
FIG. 5B illustrates example insertions of configurable delays into a set of instructions.

FIGS. 5A and 5B illustrate example insertions of configurable delays 508 into a set of instructions 506, according to various embodiments of the present disclosure. In the illustrated examples, multiple configurable delays 508 are inserted into instructions 506 for a single identified potential hotspot 512. In reference to FIG. 5A, the compiler analyzes the set of instructions 506 and generates a thermal or electrical profile 514 based on the analysis. The compiler then compares the thermal or electrical profile 514 to a single threshold 516 and identifies the potential thermal or electrical hotspot 512 where the thermal or electrical profile 514 exceeds the threshold 516.

The compiler determines the location 510 corresponding to the potential thermal or electrical hotspot 512 and inserts one configurable delay 508 at the location 510. The compiler additionally determines two locations before and one location after the location 510 for inserting additional configurable delays 508. The compiler also initializes the adjustable delay amounts of the configurable delays 508 to a value, such as a nominal delay amount $D_o$. In this manner, multiple configurable delays 508 surrounding the location 510 are employed to more effectively reduce the power consumption and/or heat generation sustained through execution of the instructions 506.

In reference to FIG. 5B, the compiler analyzes the set of instructions 506 and generates a thermal or electrical profile 514 based on the analysis. The compiler then compares the thermal or electrical profile 514 to a first threshold 516-1, a second threshold 516-2, and a third threshold 516-3, and identifies the potential thermal or electrical hotspot 512 where the thermal or electrical profile 514 exceeds each of the thresholds 516. The compiler determines the location 510 corresponding to the potential thermal or electrical hotspot 512 and inserts one configurable delay 308 at the location 510. The compiler additionally determines two locations before the location 510 for inserting additional configurable delays.

The compiler may also initialize the adjustable delay amounts of the configurable delays 508 to different values based on their proximity to location 510. In the illustrated example, the compiler initializes the adjustable delay amount of the configurable delay 508 at the location 510 to a first delay amount (e.g., $3 \times D_o$), the adjustable delay amount of the configurable delay 508 next closest to the location 510 to a second delay amount (e.g., $2 \times D_o$), and the adjustable delay amount of the configurable delay 508 furthest from the location 510 to a third delay amount (e.g., $D_o$). In this manner, multiple configurable delays 508 leading up to the location 510 are employed to more effectively reduce the significant power consumption and/or heat generation sustained through execution of the instructions 506.

Figure 6:
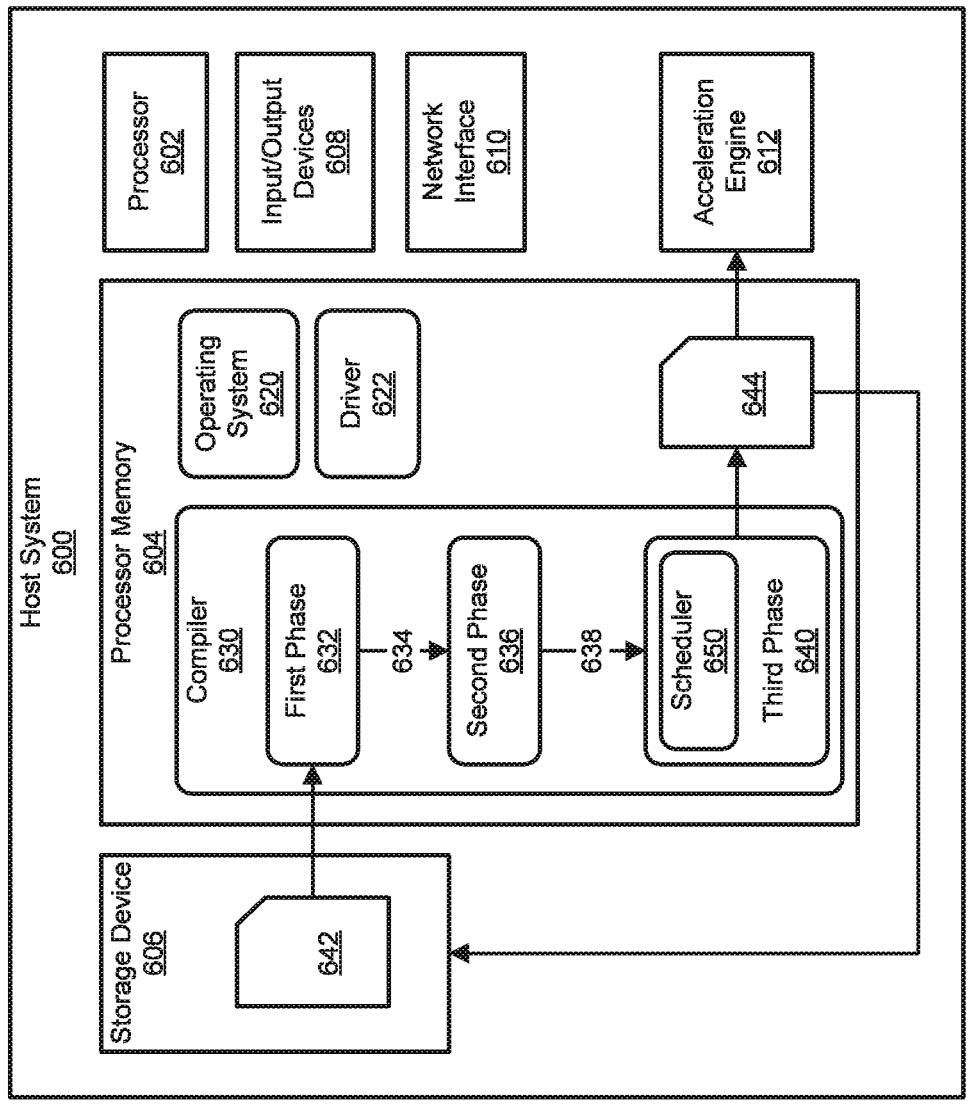
FIG. 6 illustrates a block diagram showing an example of host system.

FIG. 6 illustrates a block diagram showing an example of a host system 600 on which a compiler 630 can run. The illustrated host system 600 is an example of a computing device, and includes a processor 602, a processor memory 604, at least one storage device 606, various Input/Output (I/O) devices 608, and at least one network interface 610. In the example of FIG. 6, the host system 600 also includes an acceleration engine 612, which is an integrated circuit device that can accelerate certain operations or computations performed by the host system 600. In various examples, the host system 600 can be implemented as a server in a data center, a desktop computer, a laptop computer, a tablet computer, or a smartphone, among other examples. In some examples, operations or components discussed below as being performed or included in the host system 600 can be performed or included in other computer devices. For example, the compiler 630 can execute on the host system 600 while the acceleration engine 612 is located at a different host system.

The processor 602 is an integrated circuit device that can execute program code, in the form of instructions. The program code can be for various software applications or tools, such as an operating system 620 or the illustrated compiler 630. While the processor 602 is executing a program, the instructions for the program can be stored in the processor memory 604. The instructions can also be stored elsewhere, such as on the storage device 606, and can be loaded into the processor memory 604 when needed by the processor 602. The processor 602 can also use the processor memory 604 for temporary storage of other data on which the processor 602 is operating. In various examples, the processor memory 604 is a volatile memory type, such as a type of Random Access Memory, though non-volatile memory types can, alternatively or additionally, be used for the processor memory 604.

The storage device 606 is an example of a device that can include non-volatile memory. For example, the storage device 606 can be a magnetic disk drive, a solid state drive, or an optical drive, among other examples. The storage device 606 can further be non-transitory, such that program code and other data stored on the storage device 606 remains present when the storage device 606 is not powered on.

The storage device 606 is one example of a peripheral device, which are components that can be coupled to the host system 600 to add functionality to the host system 600. Other examples of peripheral devices include the Input/Output devices 608 and the network interface 610. The Input/Output devices 608 can include user input and output devices, such as keyboards, mice, touch screens, microphones, display screens, speakers, printers, and scanners, among other examples. The network interface 610, which can be implemented using a network interface card, can provide access to one or more networks. The network interface 610 can include, for example, a physical port for connecting a network cable and/or wireless antennas for communicating with Wi-Fi and/or cellular networks. The network interface 610 can also be described as an I/O device.

The acceleration engine 612 is also another type of peripheral device or I/O device. The acceleration engine 612 is a device that is purpose-built to perform certain operations that can be performed by the processor 602, but can be performed faster by the acceleration engine 612. For example, the acceleration engine 612 can be a neural network accelerator, and, as such, may be able to perform the large scale, parallel computations of a neural network more efficiently than when the computations are performed by the processor 602. As another example, the acceleration engine 612 can be a graphics processing unit (GPU), and may be optimized to perform the computations needed for graphics rendering. Other examples of devices that can be implemented by the acceleration engine 612 include cryptographic accelerators, compression and decompression accelerators, 3-D accelerators, regular expression accelerators, security accelerators, and others.

In various examples, the acceleration engine 612 can execute program code to perform certain operations. For example, when the acceleration engine 612 is a neural network accelerator, the acceleration engine 612 can be programmed to execute a particular neural network, such as one that performs image recognition or one that performs machine translation. As a further example, to support the execution of a neural network, the acceleration engine 612 can be programed to perform operations such as copying data for the neural network from processor memory 604 into the acceleration engine 612, copying input data for the neural network from processor memory 604 into the acceleration engine 612, and/or copying results from the acceleration engine 612 into the processor memory 604, among other examples.

To generate program code for the acceleration engine 612, in various examples, the host system 600 can execute the compiler 630. Compilers, in general, are software programs that translate program code written in a human-readable language into a format (e.g., machine instructions) that can be read and processed by an integrated circuit device. In the example of FIG. 6, the acceleration engine 612 is a neural network accelerator and the compiler 630 is for compiling a neural network description into instructions to be executed by the acceleration engine 612. When the acceleration engine 612 implements a different type of accelerator, another compiler can be used.

The compiler 630 can be activated, for example, when the operating system 620 receives keyboard, mouse, touchscreen, voice commands, or other inputs from the Input/ Output devices 608. The inputs can further include parameters for the compiler 630, such as the input code 642 to compile and configuration options for the compilation process. Once the compiler 630 is activated, the processor 602 can load the instructions for the compiler 630 into the processor memory 604, and can execute the instructions.

In the example of FIG. 6, the compiler 630 includes a first stage 632, a second stage 636, and a third stage 640, which each perform different operations to produce compiled code 644. In other examples, the compiler 630 can combine the operations of the first stage 632, second stage 636, and/or third stage 640 into fewer stages, or can divide the operations of one of the stages into multiple stages.

The first stage 632 can receive and process input code 642. The input code 642 can describe a program in a high-level programming language, such as Java, C++, or Tensorflow, among many other examples. The input code 642 can describe, for example, steps to perform image recognition, speech recognition, machine translation, or other operations. The input code 642 can be obtained, for example, from the storage device 606. Alternatively, though not illustrated here, the input code 642 may be located in the processor memory 604 or can be obtained from a network location, using the network interface 610. Processing of the input code 642 can include sorting the operations described in the input code 642 into layers, where the outputs of one layer provide the inputs to a next layer. Processing can also include identifying steps to be performed by the processor 602, rather than by the acceleration engine 612. For example, the processor 602, through the execution of a driver 622, may need to perform steps such as configuring DMA descriptors for moving data into or out of the acceleration engine 612, among other examples.

The output 634 of the first stage 632 can be organized, for example, in the layers, nodes, and connections between nodes of a neural network. The second stage 636 can perform intermediate processing on this output 634. For example, the operations performed in any one layer, or at any one node in a layer, may be too many for the acceleration engine 612 to perform at the same time. The acceleration engine 612 may, for example, have a limited amount of local storage space for the data needed for a computation, or the computations may be more than the acceleration engine 612 can perform at one time. In this example, the first stage 632 can break the operations of the layer or node down into smaller operations, which can fit into the acceleration engine's local memory and/or can fit into the computing capacity of the acceleration engine 612. Processing of the output 634 of the first stage 632 can include other steps, such as scheduling, or determining the order in which the acceleration engine 612 and/or processor 602 will perform operations, among other examples.

In various examples, the output 638 of the second stage 636 includes the various steps to be performed by components of the acceleration engine 612, in the order that the steps are to be performed. The output 638 can be represented, for example, as a data flow graph, where the nodes in the graph represent memory operations, computations, and other operations, and the edges or connections between the nodes represent dependencies between the nodes, such as data dependencies, memory dependencies, or operational dependencies, among other examples.

The third stage 640 can operate on the output 638 of the second stage 636, and perform various steps before producing the instructions that are to be executed by the acceleration engine 612. These steps can include, for example, removing redundant dependencies, resolving or handling dependencies between nodes by inserting synchronization instructions into the code, identifying possibly optimizations in memory usage or memory bandwidth usage, and other operations. In some examples, the third stage 640 can include a scheduler 650 to determine the order in which instructions are executed by the acceleration engine 612.

The output of the third stage 640 is compiled code 644, which may include machine instructions in binary format. In some examples, the compiled code 644 can be stored in the processor memory 604. Alternatively or additionally, the compiled code 644 can be copied to the storage device 606 or to a network location. As noted above, the acceleration engine 612 may be located at a different host system, in which case the compiled code 644 can be sent over the network interface 610 to the other host system.

In the example of FIG. 6, the host system 600 can be executing a driver 622, which can also be referred to as a device driver or runtime application, that manages the acceleration engine 612. The driver 622 can provide an interface between applications executing on the host system 600 (or on another host system) and the acceleration engine 612. For example, the driver 622 can provide an Application Program Interface (API) that defines functions for feeding input data to the acceleration engine 612 and defining the operation to perform on the input data. In this and other examples, the driver 622 can configure the acceleration engine 612 to perform the operation. For example, the driver 622 can identify a neural network that the acceleration engine 612 is to execute, as well as the location in the processor memory 604 or on the storage device 606 where the compiled code 644 for the neural network is located. The driver 622 can further load into the acceleration engine 612 or cause the acceleration engine 612 to load the compiled code 644, can load or cause the acceleration engine 612 to load the input data on which the neural network is to operate, and/or can cause the acceleration engine 612 to be executed on the input data. Once the acceleration engine 612 has finished, the acceleration engine 612 can notify the driver 622, and the driver 622 can deliver a result back to the application that requested the result.

Figure 7:
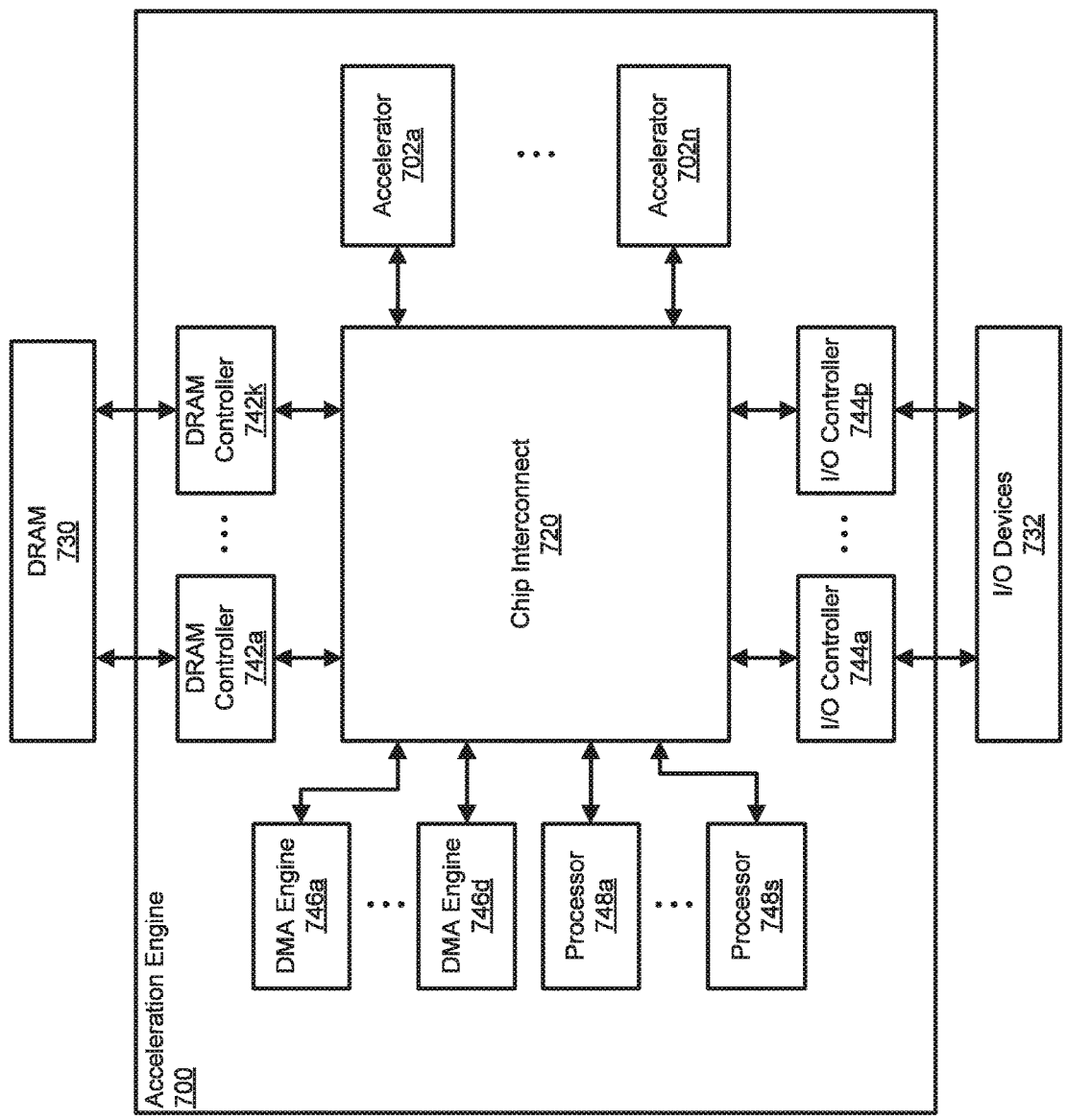
FIG. 7 illustrates a block diagram showing an example of an acceleration engine.

FIG. 7 illustrates a block diagram that shows an example of an acceleration engine 700. The acceleration engine 700 is an example of an integrated circuit that can include one or more accelerators 702a-702n that may be similar to the accelerator illustrated in FIG. 8.

In the example of FIG. 7, the acceleration engine 700 includes multiple accelerators 702a-702n, each of which can perform a set of operations. In various examples, the accelerators 702a-702n are for particular types of operations, so that the accelerators 702a-702n can perform the operations much faster than when similar operations are performed by a general purpose processor. In various examples, to perform a set of operations, input data on which the operations are to be performed must first be moved into the accelerators 702a-702n. Additionally, in some cases, program code is also moved into the accelerators 702a-702n, which programs the operations that the accelerators 702a-702n will perform on the data. In the illustrated example, the acceleration engine 700 includes n accelerators 702a-702n. Examples of accelerators that can be included in the acceleration engine 700 include graphics accelerators, floating point accelerators, neural network accelerators, and others. In various examples, the accelerators 702a-702n can each be the same (e.g., each of the is a graphics accelerator) or can be different (e.g., the accelerators 702a-702n include a graphics accelerator, a floating point accelerator, and neural network accelerator).

The example acceleration engine 700 further includes DRAM controllers 742a-742k for communicating with an external memory. The external memory is implemented, in this example, using DRAM 730. In the illustrated example, the acceleration engine 700 includes k DRAM controllers 742a-742k, each of which may be able to communicate with an independent set of banks of DRAM. In other examples, other types of RAM technology can be used for the external memory. The DRAM controllers 742a-742k can also be referred to as memory controllers.

In various examples, input data and/or program code for the accelerators 702a-702n can be stored in the DRAM 730. Different programs can cause the accelerators 702a-702n to perform different operations. For example, when one of the accelerators is a neural network accelerator, one program can configure the neural network accelerator to perform speech recognition while another program can configure the neural network accelerator to perform image recognition. In various examples, different accelerators 702a-702n can be programmed with different programs, so that each performs a different set of operations. In various examples, the processors 748a-748s can manage moving of program code from the DRAM 730 to the accelerators 702a-702n.

The example acceleration engine 700 further includes I/O controllers 744a-744p for communicating with I/O devices 732 in the system. The acceleration engine 700 can communicate with I/O devices over, for example, a processor bus. In some examples, the processor bus can be implemented using Peripheral Component Interconnect (PCI) and/or a variation of the PCI bus protocol. The processor bus can connect the acceleration engine 700 to I/O devices such as, for example, input and output devices, memory controllers, storage devices, and/or network interface cards, among other things. In some examples, the I/O controllers 744-744p can enable the acceleration engine 700 to act as an I/O device for a host processor. For example, the acceleration engine 700 can be the recipient of input data from the host processor, and a command indicating an operation to be performed on the input data (e.g., a particular computation or analysis). In the illustrated example, the acceleration engine 700 includes p I/O controllers 744a-744p, each of which may include a separate root complex and may communicate with a separate set of I/O devices 732. In other examples, other standardized bus protocols, such as Ultra Path Interconnect (UPI) can be used for the host bus. In other examples, a proprietary bus protocol can be used.

Movement of data in the acceleration engine 700 can be managed by one or more processors 748a-748s, which can also be referred to as data management processors. In the example of FIG. 7, the acceleration engine 700 includes s processors 748a-748s incorporated into the device (e.g., on the same silicon die). In other examples, the processors 748a-748s can be external to the acceleration engine 700 (e.g., on a different die and/or in a different package). In some examples, the processors 748a-748s can manage the movement of data from I/O devices 732 to the accelerators 702a-702n or the DRAM 730. For example, input data may be located at an I/O device 732 or in processor memory, and the processors 748a-748s can move the input from the I/O device 732 or processor memory into an accelerator or into DRAM 730. As another example, program code for the accelerators 702a-702n may be located on an I/O device 732 or in processor memory.

The example acceleration engine 700 further includes DMA engines 746a-746d that can move data between the accelerators 702a-702n, DRAM controllers 742a-742k, and I/O controllers 744a-744p. In the illustrated example, the acceleration engine 700 includes d DMA engines 746a-746d. In some implementations, the DMA engines 746a-746d can be assigned to specific tasks, such as moving data from the DRAM controllers 742a-742d to the accelerators 702a-702n, or moving data between the I/O controllers 744a-744p and the accelerators 702a-702n. These tasks can be assigned, for example, by enqueuing descriptors with the DMA engines 746a-746d, where a descriptor identifies an address for a block of data and an operation (e.g., a read or a write) to perform. A descriptor, for example, can direct a DMA engine to instruct a DMA controller to read a block of data from DRAM 730. A descriptor can, as a further example, instruct the DMA engine to write data, read by the DMA controller, to an accelerator. Further descriptors can be used to move data from an accelerator to DRAM 730.

In various examples, each of the processors 748a-748s can be responsible for managing the data movement for a different accelerator. In some examples, a processor may manage the data movement for more than one accelerator. Similarly, in various examples, each of the processors 748a-748s can be assigned to one or more DMA engines 746a-746d. In these and other examples, associations between processors 748a-748s, accelerators 702a-702n, and DMA engines 746a-746d are determined by program code being executed by each respective processor.

In the example acceleration engine 700, the various components can communicate over a chip interconnect 720. The chip interconnect 720 primarily includes wiring for routing data between the components of the acceleration engine 700. In some cases, the chip interconnect 720 can include a minimal amount of logic, such as multiplexors to control the direction of data, flip-flops for handling clock domain crossings, and timing logic.

Figure 8:
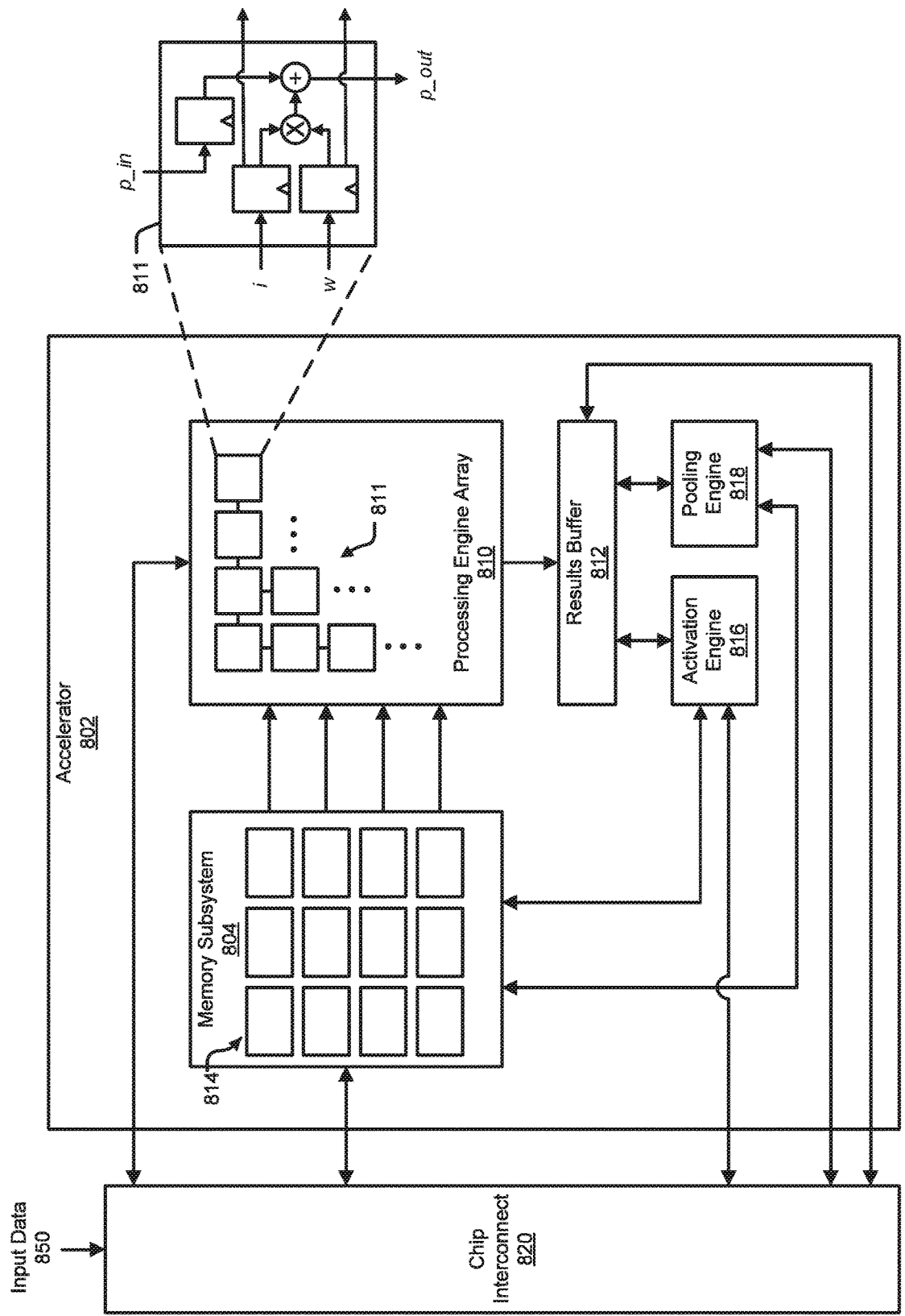
FIG. 8 illustrates a block diagram showing an example of an accelerator.

FIG. 8 illustrates a block diagram showing an accelerator 802, according to some embodiments of the present disclosure. In various examples, the accelerator 802, for a set of input data (e.g., input data 850), can execute computations using a processing engine array 810, an activation engine 816, and/or a pooling engine 818. In some examples, the example accelerator 802 may be an integrated circuit component of a processor, such as a neural network processor. The processor may have other integrated circuit components, including additional accelerator engines.

In various implementations, the memory subsystem 804 can include multiple memory banks 814. In these implementations, each memory bank 814 can be independently accessible, meaning that the read of one memory bank is not dependent on the read of another memory bank. Similarly, writing to one memory bank does not affect or limit writing to a different memory bank. In some cases, each memory bank can be read and written at the same time. Various techniques can be used to have independently accessible memory banks 814. For example, each memory bank can be a physically separate memory component that has an address space that is separate and independent of the address spaces of each other memory bank. In this example, each memory bank may have at least one read channel and may have at least one separate write channel that can be used at the same time. In these examples, the memory subsystem 804 can permit simultaneous access to the read or write channels of multiple memory banks. As another example, the memory subsystem 804 can include arbitration logic such that arbitration between, for example, the outputs of multiple memory banks 814 can result in more than one memory bank's output being used. In these and other examples, though globally managed by the memory subsystem 804, each memory bank can be operated independently of any other.

Having the memory banks 814 be independently accessible can increase the efficiency of the accelerator 802. For example, values can be simultaneously read and provided to each row of the processing engine array 810, so that the entire processing engine array 810 can be in use in one clock cycle. As another example, the memory banks 814 can be read at the same time that results computed by the processing engine array 810 are written to the memory subsystem 804. In contrast, a single memory may be able to service only one read or write at a time. With a single memory, multiple clock cycles can be required, for example, to read input data for each row of the processing engine array 810 before the processing engine array 810 can be started.

In various implementations, the memory subsystem 804 can be configured to simultaneously service multiple clients, including the processing engine array 810, the activation engine 816, the pooling engine 818, and any external clients that access the memory subsystem 804 over a communication fabric 820. In some implementations, being able to service multiple clients can mean that the memory subsystem 804 has at least as many memory banks as there are clients. In some cases, each row of the processing engine array 810 can count as a separate client. In some cases, each column of the processing engine array 810 can output a result, such that each column can count as a separate write client. In some cases, output from the processing engine array 810 can be written into the memory banks 814 that can then subsequently provide input data for the processing engine array 810. As another example, the activation engine 816 and the pooling engine 818 can include multiple execution channels, each of which can be separate memory clients. The memory banks 814 can be implemented, for example, using static random access memory (SRAM).

In various implementations, the memory subsystem 804 can include control logic. The control logic can, for example, keep track of the address spaces of each of the memory banks 814, identify memory banks 814 to read from or write to, and/or move data between the memory banks 814. In some implementations, memory banks 814 can be hardwired to particular clients. For example, a set of memory banks 814 can be hardwired to provide values to the rows of the processing engine array 810, with one memory bank servicing each row. As another example, a set of memory banks can be hard wired to receive values from columns of the processing engine array 810, with one memory bank receiving data for each column.

The processing engine array 810 is the computation matrix of the example accelerator 802. The processing engine array 810 can, for example, execute parallel integration, convolution, correlation, and/or matrix multiplication, among other things. The processing engine array 810 includes multiple processing engines 811, arranged in rows and columns, such that results output by one processing engine 811 can be input directly into another processing engine 811. Processing engines 811 that are not on the outside edges of the processing engine array 810 thus can receive data to operate on from other processing engines 811, rather than from the memory subsystem 804.

In various examples, the processing engine array 810 uses systolic execution, in which data arrives at each processing engine 811 from different directions at regular intervals. In some examples, input data can flow into the processing engine array 810 from the left and weight values can be loaded at the top. In some examples weights and input data can flow from the left and partial sums can flow from top to bottom. In these and other examples, a multiply-and-accumulate operation moves through the processing engine array 810 as a diagonal wave front, with data moving to the right and down across the array. Control signals can be input at the left at the same time as weights, and can flow across and down along with the computation.

In various implementations, the number of columns in the processing engine array 810 determines the computational capacity of the processing engine array 810, and the number of rows determines the required memory bandwidth for achieving maximum utilization of the processing engine array 810. The processing engine array 810 can have, for example, 64 columns and 428 rows, or some other number of columns and rows.

An example of a processing engine 811 is illustrated in FIG. 8 in an inset diagram. As illustrated by this example, a processing engine 811 can include a multiplier-accumulator circuit. Inputs from the left can include, for example, input data i and a weight value w, where the input data is a value taken from either a set of input data or a set of intermediate results, and the weight value is from a set of weight values that connect one layer of the neural network to the next. A set of input data can be, for example, an image being submitted for identification or object recognition, an audio clip being provided for speech recognition, a string of text for natural language processing or machine translation, or the current state of a game requiring analysis to determine a next move, among other things. In some examples, the input data and the weight value are output to the right, for input to the next processing engine 811.

In the illustrated example, an input from above can include a partial sum, p_in, provided either from another processing engine 811 or from a previous round of computation by the processing engine array 810. When starting a computation for a new set of input data, the top row of the processing engine array 810 can receive a fixed value for p_in, such as zero. As illustrated by this example, i and w are multiplied together and the result is summed with p_in to produce a new partial sum, p_out, which can be input into another processing engine 811. Various other implementations of the processing engine 811 are possible.

Outputs from the last row in the processing engine array 810 can be temporarily stored in the results buffer 812. The results can be intermediate results, which can be written to the memory banks 814 to be provided to the processing engine array 810 for additional computation. Alternatively, the results can be final results, which, once written to the memory banks 814 can be read from the memory subsystem 804 over the communication fabric 820, to be output by the system.

In some implementations, the accelerator 802 includes an activation engine 816. In these implementations, the activation engine 816 can combine the results from the processing engine array 810 into one or more output activations. For example, for a convolutional neural network, convolutions from multiple channels can be summed to produce an output activation for a single channel. In other examples, accumulating results from one or more columns in the processing engine array 810 may be needed to produce an output activation for a single node in the neural network. In some examples, activation engine 816 can be bypassed.

In various examples, the activation engine 816 can include multiple separate execution channels. In these examples, the execution channels can correspond to the columns of the processing engine array 810, and can perform an operation on the outputs of a column, the result of which can be stored in the memory subsystem 804. In these examples, the activation engine 816 may be able to perform between 1 and n parallel computations, where n is equal to the number of columns in the processing engine array 810. In some cases, one or more of the computations can be performed simultaneously. Examples of computations that each execution channel can perform include exponentials, squares, square roots, identities, binary steps, bipolar steps, sigmoidals, and ramps, among other examples.

In some implementations, the accelerator 802 can include a pooling engine 818. Pooling is the combining of outputs of the columns of the processing engine array 810. Combining can include for example, computing a maximum value, a minimum value, an average value, a median value, a summation, a multiplication, or another logical or mathematical combination. In various examples, the pooling engine 818 can include multiple execution channels that can operate on values from corresponding columns of the processing engine array 810. In these examples, the pooling engine 818 may be able to perform between 1 and n parallel computations, where n is equal to the number of columns in the processing engine array 810. In various examples, execution channels of the pooling engine 818 can operate in parallel and/or simultaneously. In some examples, the pooling engine 818 can be bypassed.

Herein, the activation engine 816 and the pooling engine 818 may be referred to collectively as execution engines. The processing engine array 810 is another example of an execution engine. Another example of an execution engine is a DMA engine, which may be located outside the accelerator 802.

Input data 850 can arrive over the communication fabric 820. The communication fabric 820 can connect the accelerator 802 to other components of a processor, such as a DMA engine that can obtain input data 850 from an Input/Output (I/O) device, a storage drive, or a network interface. The input data 850 can be, for example one-dimensional data, such as a character string or numerical sequence, or two-dimensional data, such as an array of pixel values for an image or frequency and amplitude values over time for an audio signal. In some examples, the input data 850 can be three-dimensional, as may be the case with, for example, the situational information used by a self-driving car or virtual reality data. In some implementations, the memory subsystem 804 can include a separate buffer for the input data 850. In some implementations, the input data 850 can be stored in the memory banks 814 when the accelerator 802 receives the input data 850.

In some examples, the accelerator 802 can implement a neural network processing engine. In these examples, the accelerator 802, for a set of input data 850, can execute a neural network to perform a task for which the neural network was trained. Executing a neural network on a set of input data can be referred to as inference or performing inference.

The weights for the neural network can be stored in the memory subsystem 804, along with input data 850 on which the neural network will operate. The neural network can also include instructions, which can program the processing engine array 810 to perform various computations on the weights and the input data. The instructions can also be stored in the memory subsystem 804, in the memory banks 814 or in a separate instruction buffer. The processing engine array 810 can output intermediate results, which represent the outputs of individual layers of the neural network. In some cases, the activation engine 816 and/or pooling engine 818 may be enabled for computations called for by certain layers of the neural network. The accelerator 802 can store the intermediate results in the memory subsystem 804 for inputting into the processing engine array 810 to compute results for the next layer of the neural network. The processing engine array 810 can further output final results from a last layer of the neural network. The final results can be stored in the memory subsystem 804 and then be copied out to host processor memory or to another location.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in the preceding figures, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Various examples of this disclosure are described herein, including the best mode known to the inventors for carrying out the disclosure. Variations of those examples may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A computer-implemented method comprising:
   generating, by a compiler, a set of instructions to be executed on a set of acceleration engines, wherein each of the set of acceleration engines is embedded onto one of a set of chips, and wherein the set of chips are at least partially electrically or thermally isolated from each other, wherein generating the set of instructions includes performing a scheduling of the set of instructions;
   inserting, by the compiler, a set of configurable delays into the set of instructions, wherein each of the set of configurable delays includes an adjustable delay amount that delays an execution of the set of instructions on the set of acceleration engines, wherein the adjustable delay amount for one of the set of configurable delays is a first delay amount, and wherein the adjustable delay amount is adjustable by a runtime application that facilitates the execution of the set of instructions on the set of acceleration engines;
   after the scheduling of the set of instructions has completed, determining, by the runtime application, a runtime condition associated with the execution of the set of instructions on the set of acceleration engines;
   adjusting, by the runtime application, the set of configurable delays based on the runtime condition, wherein adjusting the set of configurable delays includes increasing or decreasing the adjustable delay amount for one of the set of configurable delays from the first delay amount to a second delay amount;
   executing the set of instructions on the set of acceleration engines; and
   while executing the set of instructions, delaying the execution of the set of instructions in accordance with the adjustable delay amount for each of the set of configurable delays.

2. The computer-implemented method of claim 1, further comprising:
   performing, by the compiler, an analysis of the set of instructions; and
   determining, by the compiler, a set of locations in the set of instructions for potential thermal or electrical hotspots based on the analysis, wherein the set of configurable delays are inserted into the set of instructions at the set of locations.

3. The computer-implemented method of claim 2, wherein performing the analysis includes:
   generating a thermal or electrical profile associated with the set of instructions based on an expected execution of the set of instructions on the set of acceleration engines.

4. The computer-implemented method of claim 1, wherein each of the set of configurable delays includes an adjustable no operation (NOP) instruction.

5. A method implemented by a compiler, the method comprising:
   generating a set of instructions to be executed on a set of engines, wherein the set of engines are distributed between a set of hardware elements, wherein generating the set of instructions includes performing a scheduling of the set of instructions; and
   inserting a set of configurable delays into the set of instructions, wherein each of the set of configurable delays includes an adjustable delay amount that delays an execution of the set of instructions on the set of engines, wherein the adjustable delay amount for one of the set of configurable delays is a first delay amount, and wherein the adjustable delay amount is adjustable by a runtime application that facilitates the execution of the set of instructions on the set of engines;
   wherein, after the scheduling of the set of instructions has completed, the runtime application is configured to determine a runtime condition associated with the execution of the set of instructions on the set of engines and to adjust the set of configurable delays based on the runtime condition, wherein adjusting the set of configurable delays includes increasing or decreasing the adjustable delay amount for one of the set of configurable delays from the first delay amount to a second delay amount.

6. The method of claim 5, wherein the runtime condition includes one or more of:
   a total number of used engines from the set of engines on the set of hardware elements;
   a distribution of used engines from the set of engines between the set of hardware elements;
   a maximum number of used engines from the set of engines on a single hardware element from the set of hardware elements; or
   a size of an input associated with the execution of the set of instructions on the set of engines.

7. The method of claim 5, wherein the set of engines are a set of acceleration engines.

8. The method of claim 7, wherein each of the set of acceleration engines includes one or more of a processing engine (PE) array, an activation engine, or a pooling engine.

9. The method of claim 5, further comprising:
   performing an analysis of the set of instructions; and
   determining a set of locations in the set of instructions for potential thermal or electrical hotspots based on the analysis, wherein the set of configurable delays are inserted into the set of instructions at the set of locations.

10. The method of claim 9, wherein performing the analysis includes:
    generating a thermal or electrical profile associated with the set of instructions based on an expected execution of the set of instructions on the set of engines.

11. The method of claim 5, wherein each of the set of configurable delays includes an adjustable no operation (NOP) instruction.

12. The method of claim 5, wherein each of the set of configurable delays includes an instruction to control a hardware throttle mechanism that adjusts a rate for executing the set of instructions.

13. A non-transitory computer-readable medium having stored therein instructions that, when executed by one or more processors cause the one or more processors to execute a compiler, the compiler performing operations including:
generating a set of instructions to be executed on a set of engines, wherein the set of engines are distributed between a set of hardware elements, wherein generating the set of instructions includes performing a scheduling of the set of instructions; and
inserting a set of configurable delays into the set of instructions, wherein each of the set of configurable delays includes an adjustable delay amount that delays an execution of the set of instructions on the set of engines, wherein the adjustable delay amount for one of the set of configurable delays is a first delay amount, and wherein the adjustable delay amount is adjustable by a runtime application that facilitates the execution of the set of instructions on the set of engines;
wherein, after the scheduling of the set of instructions has completed, the runtime application is configured to determine a runtime condition associated with the execution of the set of instructions on the set of engines and to adjust the set of configurable delays based on the runtime condition, wherein adjusting the set of configurable delays includes increasing or decreasing the adjustable delay amount for one of the set of configurable delays from the first delay amount to a second delay amount.

14. The non-transitory computer-readable medium of claim 13, wherein the runtime condition includes one or more of:
a total number of used engines from the set of engines on the set of hardware elements;
a distribution of used engines from the set of engines between the set of hardware elements;
a maximum number of used engines from the set of engines on a single hardware element from the set of hardware elements; or
a size of an input associated with the execution of the set of instructions on the set of engines.

15. The non-transitory computer-readable medium of claim 13, wherein the set of engines are a set of acceleration engines.

16. The non-transitory computer-readable medium of claim 15, wherein each of the set of acceleration engines includes one or more of a processing engine (PE) array, an activation engine, or a pooling engine.

17. The non-transitory computer-readable medium of claim 13, wherein the operations further comprise:
performing an analysis of the set of instructions; and
determining a set of locations in the set of instructions for potential thermal or electrical hotspots based on the analysis, wherein the set of configurable delays are inserted into the set of instructions at the set of locations.

18. The non-transitory computer-readable medium of claim 17, wherein performing the analysis includes:
generating a thermal or electrical profile associated with the set of instructions based on an expected execution of the set of instructions on the set of engines.

19. The non-transitory computer-readable medium of claim 13, wherein each of the set of configurable delays includes an adjustable no operation (NOP) instruction.

20. A non-transitory computer-readable medium having stored therein instructions that, when executed by one or more processors cause the one or more processors to execute a runtime application, the runtime application performing operations including:
obtaining a set of instructions to be executed on a set of engines, wherein the set of engines are distributed between a set of hardware elements, wherein the set of instructions have a set of configurable delays inserted therein by a compiler that performs a scheduling of the set of instructions, wherein each of the set of configurable delays includes an adjustable delay amount that delays an execution of the set of instructions on the set of engines, and wherein the adjustable delay amount for one of the set of configurable delays is a first delay amount;
determining a runtime condition associated with the execution of the set of instructions on the set of engines, wherein the runtime condition is determined after the scheduling of the set of instructions has completed; and
adjusting the set of configurable delays based on the runtime condition, wherein adjusting the set of configurable delays includes increasing or decreasing the adjustable delay amount for one of the set of configurable delays from the first delay amount to a second delay amount.

\* \* \* \* \*